UNITED STATES PATENT OFFICE.

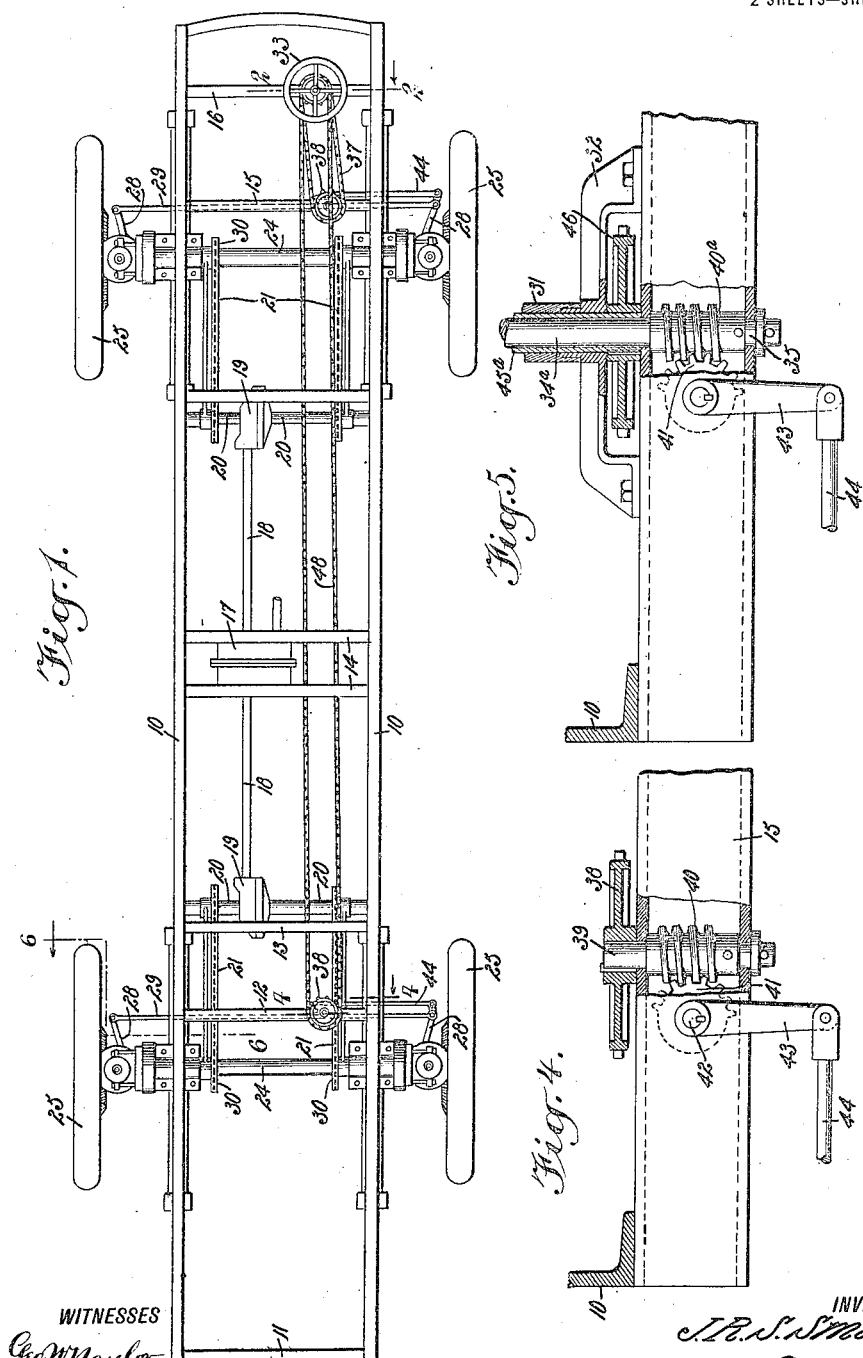

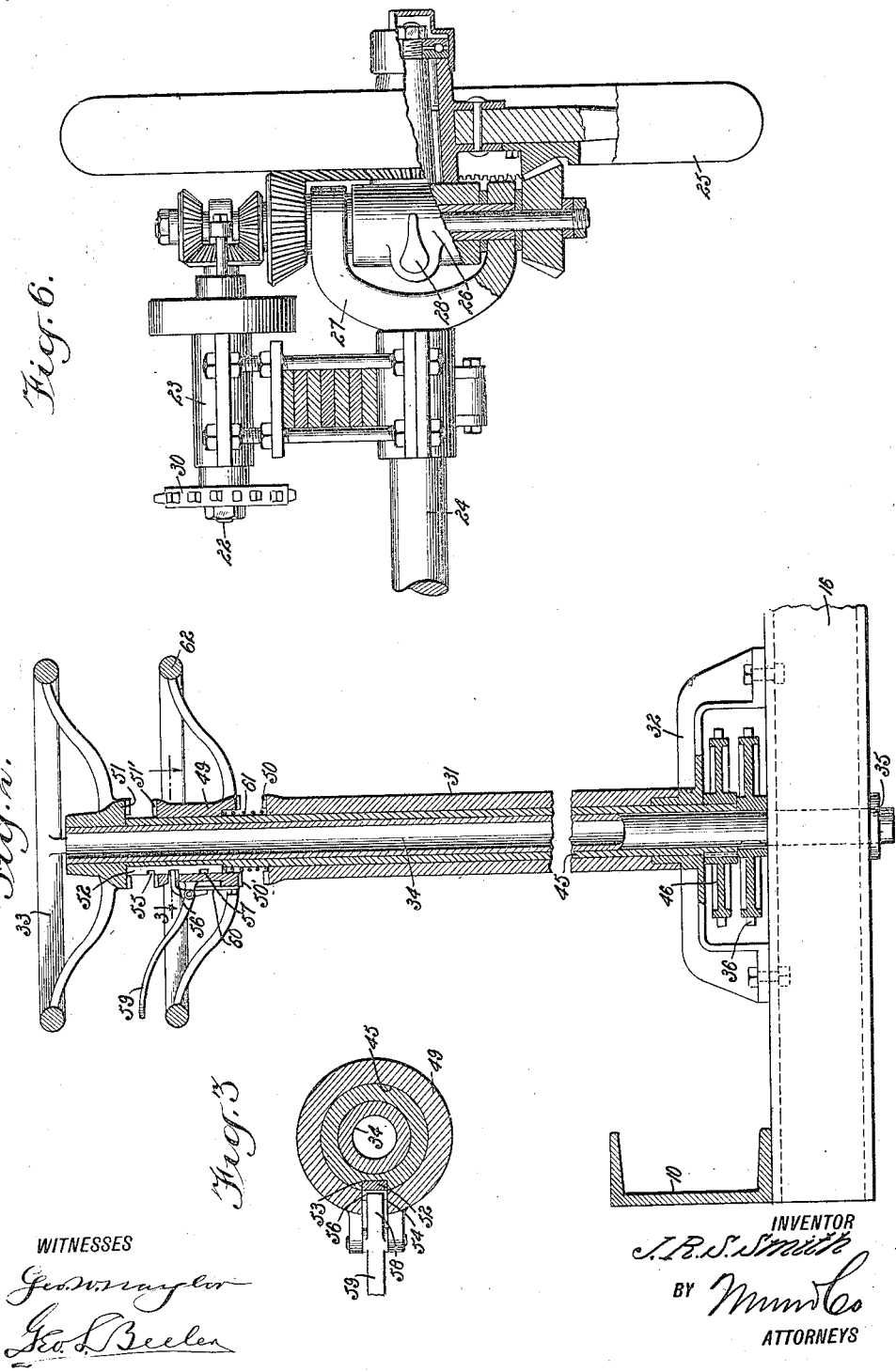

JOSEPH RYAN STILL SMITH, OF PLACERVILLE, COLORADO.

STEERING-GEAR.

1,223,907.  Specification of Letters Patent.  Patented Apr. 24, 1917.

Original application filed April 21, 1915, Serial No. 22,811. Divided and this application filed April 22, 1916. Serial No. 93,017.

*To all whom it may concern:*

Be it known that I, JOSEPH R. S. SMITH, a citizen of the United States, and a resident of Placerville, San Miguel county, Colorado, have invented a new and Improved Steering-Gear, of which the following is a full, clear, and exact description.

This invention relates to motor vehicles or other analogous machines and has particular reference to steering gears for such machines.

Among the objects of the invention is to provide an improved mechanism whereby the driver may have direct and effective control of either the front wheels or the rear wheels independently of each other or whereby he may operate all of the wheels at the same time.

Another object of the invention is to improve the facilities for steering all of the wheels of a vehicle whose wheels are all adapted to be driven positively through independent connections with a single prime mover as fully explained and claimed in my copending application filed April 21, 1915, Serial No. 22,811, allowed December 13, 1915, and of which application this is a division.

With the foregoing and other objects in view, the invention consists in the arrangement and combination of parts hereinafter described and claimed, and while the invention is not restricted to the exact details of construction disclosed herein, still for the purpose of illustrating a practical embodiment thereof reference is had to the accompanying drawings, in which like reference characters designate the same parts in the several views, and in which—

Figure 1 is a plan view of a four-wheel drive automobile chassis showing the running gear and driving and steering devices in diagram;

Fig. 2 is a vertical transverse section on the line 2—2 of Fig. 1;

Fig. 3 is a transverse sectional detail on the line 3—3 of Fig. 2;

Fig. 4 is a transverse sectional detail on the line 4—4 of Fig. 1;

Fig. 5 is a view somewhat similar to Fig. 4 but corresponding more nearly to the lower portion of Fig. 2 and representing a modified form of the invention; and Fig. 6 is a detail view of the driving mechanism shown herein to make clear the arrangement and operation of the steering devices.

Referring now to Fig. 1 for a general understanding of the machine, I show a vehicle chassis comprising longitudinal bars 10 connected by transverse bars 11, 12, 13, 14, 15, 16 and any other suitable connections. At 17 is indicated a prime mover having forwardly and rearwardly projecting shafts 18 leading to differential gear casings 19 through which transverse shafts 20 are operated for independent operation of driving sprocket chains 21 leading to as many independent shafts 22 journaled in vertically adjustable bearings 23 above the main axles 24 of the vehicle. As shown herein and as used in practice, each of the four wheels 25 is journaled upon a steering knuckle 26 mounted within a yoke 27 and adjustable around a vertical axis therein, said yoke being connected to the main axle 24. The steering knuckle has an arm 28 projecting therefrom and the arms 28 of each pair of front or rear wheels are connected by a bar 29. To each of the shafts 22 is connected a sprocket wheel 30 over which the adjacent chain 21 operates.

Reverting now to the steering devices more particularly and as shown best in Fig. 2, I provide a hollow stationary post 31 secured upon and extending upwardly from the cross bar 16, the same being connected directly to a housing or bracket 32 constituting a guard for certain parts soon to be described. At 33 is indicated a main hand wheel fixed upon the upper end of a shaft 34 journaled at its lower end at 35 in the cross bar 16. Within the open space in the bracket 32 is arranged a sprocket wheel 36 secured rigidly to the shaft 34. From this wheel a short sprocket chain 37 operates to and over a sprocket wheel 38 connected to the upper end of a worm shaft 39 journaled in the cross bar 15. The worm 40 meshes with a worm gear 41 connected to a transverse shaft 42 journaled horizontally in the cross bar 15 and having connected thereto an arm 43 from which a link 44 extends into connection with the arm 28 at one side of the vehicle. By this means rotation of the hand wheel 33 and shaft 34 in one direction will tend to steer the front wheels in a corresponding direction depending upon the character of the worm 40. This operation is predicated upon the fact that the shaft 34 is adapted to be journaled for free rotation within the post 31.

Surrounding the shaft 34 and between it and the fixed post 31 is a hollow shaft 45 likewise adapted for free rotation within the post and having secured at its lower end within the opening of the bracket 32 another sprocket wheel 46 from which a longer sprocket chain 48 leads to the rear truck of the vehicle and over a sprocket wheel 38 connected to a worm shaft 39 for operation of the rear wheels in connection with the front wheels through the chain 37.

At 49 I show a hub mounted upon the hollow shaft 45 and slidable up and down thereon between a clutch head 50 at the upper end of the post 31 and a similar clutch head 51 at the lower portion of the hand wheel 33. The hub 49 is provided with clutch teeth 50' and 51' adapted to engage in alternation with the respective clutch heads 50 and 51 depending upon the position of the hub along the shaft 45. The hub is held, however, from rotation with respect to the hollow shaft 45 by means of a locking plate 52 extending into a groove 53 in the hollow shaft and into a similar groove 54 formed on the inner surface of the hub 49. This locking plate is provided with a series of notches 55, 56 and 57 into which the point 58 of a bell crank controlling lever 59 is adapted to project under the force of a leaf spring 60 secured to the hub 49; otherwise, however, the locking plate does not interfere with the up and down sliding movements of the hub. A spring 61 is mounted between the hub and the clutch head 50 of the post and tends to lift the hub and lower hand wheel 62 connected thereto.

When the hand wheel 62 and hub 49 are forced downwardly against the spring 61, bringing the teeth 50 and 50' into engagement, the point 58 of the locking lever will snap into the notch 57, thereby locking the hand wheel 62 down to its lowermost position, and through the fixed post 31 this hand wheel and hollow shaft 45 are locked stationary and thereby the rear wheels are held from steering movement.

When the locking dog or lever 59 is released from the last named position and the hand wheel 62 and hub 49 are brought up into engagement with the clutch head 51 of the upper wheel and there held by the locking dog entering the notch 55, the two hand wheels and two steering shafts 34 and 45 are locked together for simultaneous movement through manipulation of either of the hand wheels. By this arrangement the steering may be effected through both front and rear wheels, the turning of which may be in the same direction or in opposite directions, depending, as intimated above, upon the direction of the threads of the worms 40.

When the hub 49 is locked in its mid position, as shown in Figs. 2 and 3, and out of engagement with both of the clutch heads 50 and 51, both hand wheels and parts connected individually thereto are free for independent rotation by the operator in either direction.

The structure shown in Fig. 5 is somewhat simpler than that above described and comprises a steering worm 40$^a$ connected directly to the primary steering shaft 34$^a$, and surrounding this shaft is a secondary or hollow shaft 45$^a$ having connected to its lower end, as before, a sprocket wheel 46.

I claim:—

The herein described steering devices for automobiles, the same comprising a fixed tubular post, a pair of independently rotatable shafts journaled coaxially of the post, a pair of hand wheels connected to the respective rotary shafts and each held from rotation with relation to its shaft, the holding means for one of the hand wheels including a hub slidable along its shaft, and means to control the sliding movement of the hub whereby the hand wheel connected thereto is adapted to be locked either to the post for non-rotation, to the other hand wheel for rotation therewith, or in a mid position independent of both the other hand wheel and the post.

JOSEPH RYAN STILL SMITH.

Witnesses:
 LEWIS E. JOHNSON,
 FERNANDO MAYNARD.